(12) United States Patent
Holmes (10) Patent No.: US 7,552,715 B1
(45) Date of Patent: Jun. 30, 2009

(54) UNIVERSAL INJECTION VALVE ASSEMBLY

(76) Inventor: Jeremy Holmes, 14308 SW. 120th Ct., Miami, FL (US) 33186

( * ) Notice: Subject to any disclaimer, the term of this patent is extended or adjusted under 35 U.S.C. 154(b) by 569 days.

(21) Appl. No.: 11/037,583

(22) Filed: Jan. 18, 2005

Related U.S. Application Data (63) Continuation-in-part of application No. 10/099,113, filed on Mar. 15, 2002, now Pat. No. 6,928,992.

(51) Int. Cl.
*F02M 57/02* (2006.01)
*B05B 1/30* (2006.01)
*F16K 31/02* (2006.01)

(52) U.S. Cl. ............... 123/446; 239/584; 251/129.06

(58) Field of Classification Search ............ 123/496, 123/497, 498, 446, 472, 476; 251/129.06, 251/57; 239/102.2, 584, 585.1
See application file for complete search history.

(56) References Cited

U.S. PATENT DOCUMENTS

| | | | |
|---|---|---|---|
| 3,361,353 A | 1/1968 | Millman | |
| 3,648,669 A | 3/1972 | Rank | |
| 3,762,378 A | 10/1973 | Bitonti | |
| 4,030,456 A | 6/1977 | Corpus | |
| 4,059,078 A | 11/1977 | Ramiro de la Rosa | |
| 4,346,675 A | 8/1982 | Holliday, Jr. | |
| 4,359,971 A | 11/1982 | Rogers | |
| 4,391,229 A | 7/1983 | Turner | |
| 4,458,655 A | 7/1984 | Oza | |
| 4,800,848 A | 1/1989 | Hubbard | |
| 4,946,103 A | 8/1990 | Ganser | |
| 4,986,223 A | 1/1991 | Mahoney | |
| 5,159,915 A * | 11/1992 | Saito et al. | 123/557 |
| 5,452,858 A * | 9/1995 | Tsuzuki et al. | 239/533.8 |
| 5,758,826 A * | 6/1998 | Nines | 239/136 |
| 6,296,197 B1 * | 10/2001 | Boecking | 239/88 |
| 6,305,398 B1 | 10/2001 | Logar et al. | |

FOREIGN PATENT DOCUMENTS

| | | |
|---|---|---|
| JP | 2000008883 A | 1/2000 |
| WO | WO 9415092 A1 | 7/1994 |

* cited by examiner

*Primary Examiner*—Chen-Wen Jiang
(74) *Attorney, Agent, or Firm*—Malloy & Malloy, P.A.

(57) ABSTRACT

A universal injection valve assembly including an injector assembly having a housing, and a control member movably interconnected to the injector assembly, the control member normally disposed in an operative position relative to the housing. Specifically, the control member is normally disposed in a sealing engagement with a seat of the housing, thereby at least partially defining the operative position. The universal injection valve assembly further includes an actuation assembly having an actuator and an induction mechanism, wherein the induction mechanism is structured to at least temporarily dispose the actuator into an energized state. An induction temperature control unit is included to regulate a temperature of the induction mechanism. The control member may at least partially comprise material attracted to the actuator in the energized state, thereby facilitating displacement of the control member from the operative position. The actuator may further comprise primary and secondary stops to facilitate variable displacement of the control member while the actuator is in an energized state.

29 Claims, 3 Drawing Sheets

UNIVERSAL INJECTION VALVE ASSEMBLY

CLAIM OF PRIORITY

The present application is a continuation-in-part application of previously filed and currently U.S. patent application having Ser. No. 10/099,113, filed on Mar. 15, 2002 now U.S. Pat. No. 6,928,992, which is incorporated herein by reference.

BACKGROUND OF THE INVENTION

1. Field of the Invention

The present invention is directed to a universal injection valve assembly. Specifically, the invention relates to an injection valve assembly structured to provide rapid, cyclic, and direct injection of an operative fluid, having an elevated temperature and pressure, into a chamber, such that the operative fluid rapidly expands or "flashes" into an accurately controlled amount of high pressure vapor capable of performing work in the chamber, for example, moving a piston in the cylinder of an engine.

2. Description of the Related Art

The benefits derived from the addition of a heated vapor, for example, steam, to a conventional air-fuel mixture prior to injection into a cylinder of a conventional internal combustion engine have been known for some time. One important advantage is the increase in the percentage of completion of combustion, which necessarily results in an increase in the horsepower generated and an improvement in fuel efficiency. The improved operational efficiency further results in an improvement in the air emissions (i.e. a reduction in emissions). Given the numerous advantages available from the addition of a vapor, such as steam, to a conventional air-fuel mixture, numerous devices have been developed attempting to harness and control this process. However, to date, few of these devices have found widespread acceptance and utilization, mainly due to the complexity of handling and, more importantly, controlling the quality and/or the quantity or rate of flow of the steam.

In particular, a common pitfall of many of these devices is that the components utilized for steam generation and delivery are often related to certain operating characteristics of the engine, such as combustion, as well as intake manifold vacuum pressure, engine speed, and/or quality and quantity of high temperature radiation from operation of the engine available for steam generation. In these devices, the quality and/or quantity of steam generated is dependent on one or more operating characteristics of the engine itself, once again, such as combustion, thereby requiring almost continuous adjustment of the operation of the engine to maintain a constant rate of flow of the steam. It is primarily this factor which is believed to be the reason why these devices have not achieved widespread acceptance and utilization.

Additionally, external factors, such as adverse weather conditions, may have a particularly severe and negative impact upon the viability of adding steam to a conventional air-fuel mixture. For example, many areas of the United States experience outdoor temperatures well below the freezing point of water for at least some portion of the year. Under these conditions, any residual water vapor remaining in a device, or its appurtenances, intended for outdoor use, such as an automobile engine, is at risk of freezing when the engine is not operating, which could easily result in temporary blockage of flow through the steam injection device. In more severe cases, freezing water vapor could result in the rupturing of lines, freezing of throttle plates, fittings, and/or other components of the steam injection device as the freezing water vapor expands on the inside of these components. Thus, in spite of the numerous advantages which may be obtained from the addition of steam to a conventional air-fuel mixture, the widespread acceptance and utilization of devices structured to achieve this goal has not become a reality.

In addition to the injection of steam into a conventional air-fuel mixture for conventional internal combustion engines, other engines which are structured to operate solely on steam are well known, for example, large scale conventional steam turbines and steam locomotive engines. These large scale systems are generally structured to operate on an almost continuously basis, and as such, they often derive their input energy from a continuous feed of live steam having an elevated temperature and pressure. Historically, however, attempts to scale down and regulate these large scale, continuous, live steam systems in relatively small scale, intermittently operated systems, for example, a four cycle engine, have been plagued with significant efficiency losses. It is believed that among the efficiency problems associated with the small scale systems is the energy loss of the live steam as it is acted upon by the dynamics of the small scale system. While it is understood that dynamic losses are present in large scale systems as well, the overall impact of the energy loss of the live steam is not as significant in terms of system efficiency, due in part to the large volume of steam utilized in such systems, as it is in relatively small scale systems.

A further difficulty encountered with attempts to scale down continuous, live steam systems is the accurate control of the quantity or rate of flow of live steam to a particular component of the system. This is a problem common to handling any compressible material, as there is a delicate balance and constant trade off between pressure, volume, and temperature. As such, and as noted above, given that steam energy losses are directly related to the system configuration, materials of construction, insulation factors, etc., these losses are exaggerated in small scale systems, particularly due to increased frictional and thermal losses through smaller scale pipes and fittings. Thus, to accurately control the quantity or rate of flow of steam to be delivered to a particular component of a system, the balance and interaction between the various components of the system and their impact upon a given quantity of steam at a given temperature and pressure must be completely understood and configured to ensure accurate delivery of the desired quantity and quality of steam at any point in the system. As it should be appreciated, given the extreme change in temperatures in the components of an intermittently operated small scale engine, for example, a four cycle automobile engine, accurate control of the quality and/or quantity of steam to a particular component of such an engine requires almost continuous and precise adjustment of the quality and/or quantity of the steam injection device.

As such, it would be beneficial for an assembly to permit direct injection of an accurately controlled amount of an operative fluid at a predetermined temperature and pressure to a combustion chamber of a small scale engine or other device, such as, for example, a stirling engine or a 4-cycle steam engine. Further, it would be advantageous for such an assembly to be capable of providing the accurately controlled amount of operative fluid at any one of a number of cyclic rates, such as the small scale engine or other device may demand due to different loads. Additionally, it would be helpful for such an assembly to be capable of providing any one of a number of accurately controlled amounts of the operative fluid at a given cyclic rate, such as the small scale engine or other device may demand due to different loads. Also, it would be beneficial to provide an assembly which is able to quickly and efficiently alternate between the numerous cyclic rates or accurately controlled amounts per operating cycle as may be required by the small scale engine or other devices, such as, for example, a stirling engine or a 4-cycle steam engine, without adversely affecting the operational efficiency of the engine or other device.

SUMMARY OF THE INVENTION

The present invention is directed to a universal injection valve assembly comprising an injector assembly having a housing. The injector assembly includes an inlet aperture and an outlet aperture, generally disposed to receive and discharge, respectively, an operative fluid into and out of the housing of the injector assembly. In at least one embodiment of the present invention, the inlet and outlet apertures are disposed in fluid communication with a chamber, structured to at least temporarily hold the operative fluid within the housing. Further, in at least one embodiment of the present invention, the housing includes a seat disposed adjacent to the outlet aperture.

In addition to the injector assembly, the universal injection valve assembly of the present invention comprises a control member which is movably interconnected to the housing. The control member is normally disposed in an operative position relative to the housing. More specifically, the control member is disposed in a sealing engagement with the seat of the housing, thereby at least partially defining the operative position. In at least one embodiment of the present invention, the control member includes a distal end. In this embodiment, the operative position is further defined by the distal end of the control member being disposed in a fluid restricting engagement with the seat of the housing.

The universal injection valve assembly of the present invention further comprises an actuation assembly, wherein the actuation assembly includes an actuator. The actuator is cooperatively disposed to at least temporarily displace the control member out of the operative position. In at least one embodiment of the present invention, the actuation assembly also includes an induction mechanism which is structured to at least temporarily dispose the actuator into an energized state. Furthermore, in this embodiment, the control member at least partially comprises material which is attracted to the actuator in the energized state, thereby facilitating the displacement of the control member from the operative position.

These and other features of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
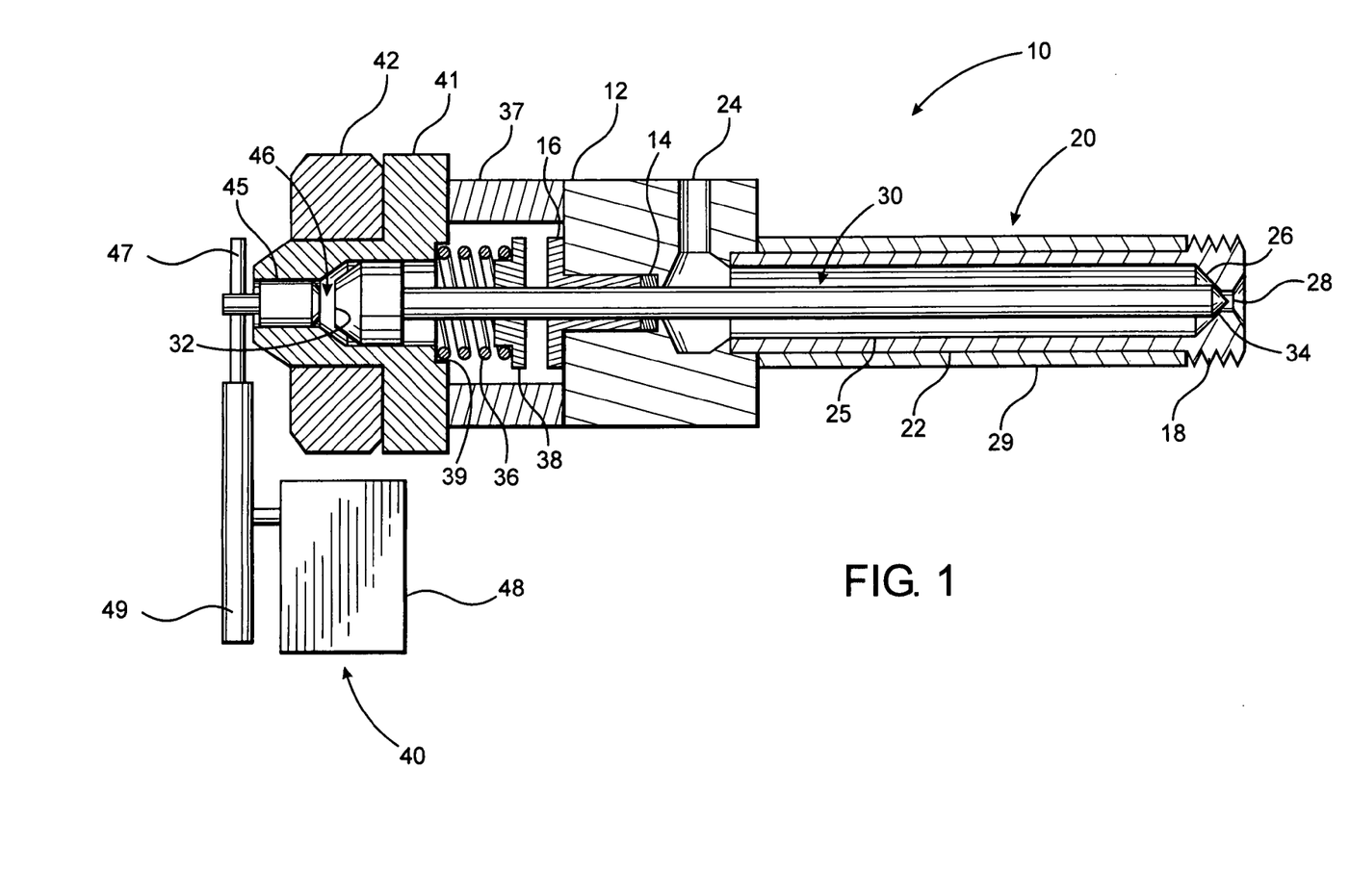
FIG. 1 is a cross-sectional view of one embodiment of a universal injection valve assembly of the present invention illustrating a control member in a fully closed orientation.
Figure 2:
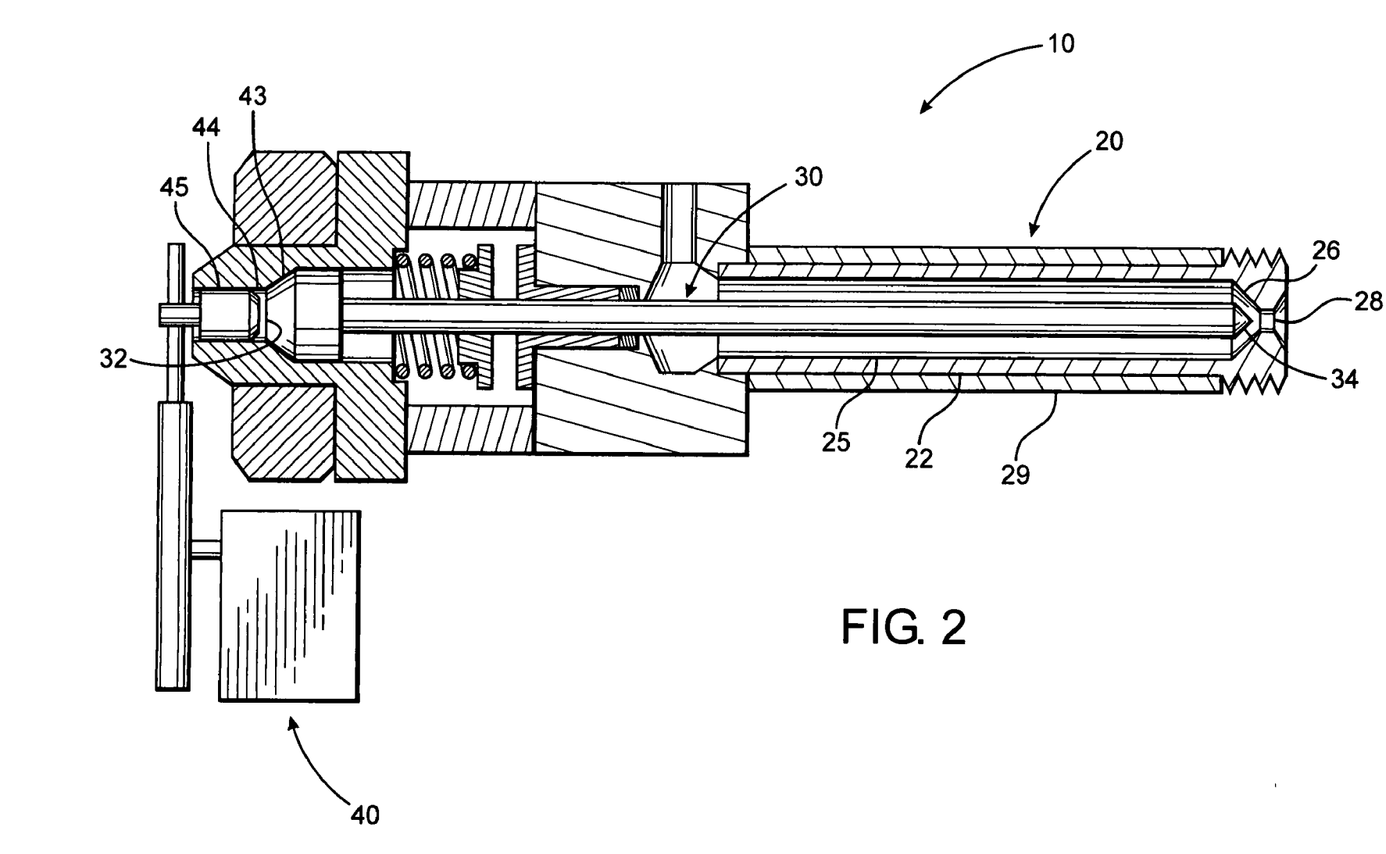
FIG. 2 is a cross-sectional view of the embodiment of FIG. 1 illustrating the control member in a fully open orientation.
Figure 3:
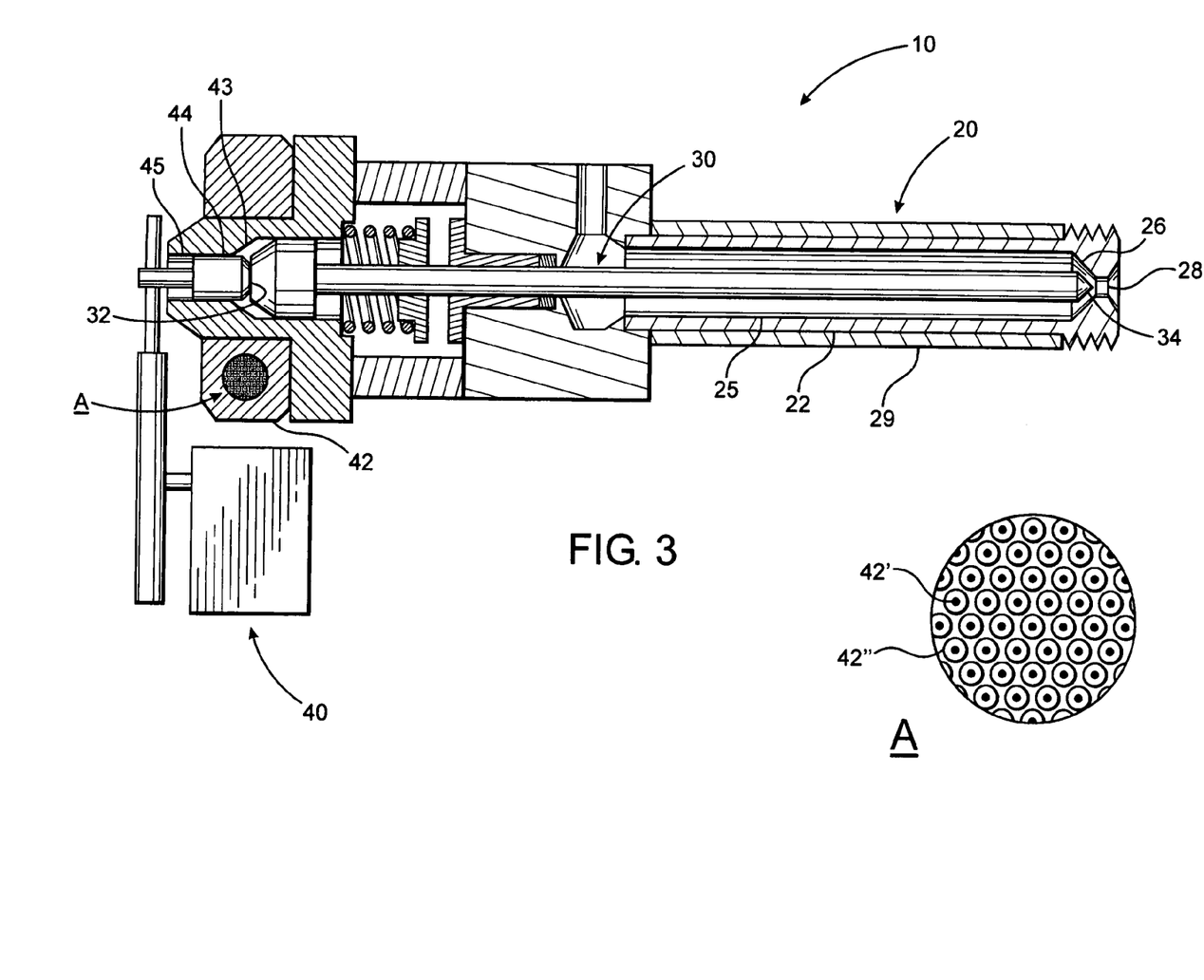
FIG. 3 is a cross-sectional view of the embodiment of FIG. 1 illustrating the control member in a partially open orientation, and further providing an exploded cross-sectional view of a portion of an induction mechanism and an inductor temperature control unit, as shown in A.

As previously indicated, the present invention is directed to a universal injection valve assembly, generally shown as 10 throughout the Figures. The universal injection valve assembly 10 comprises an injector assembly, generally shown as 20, which includes a housing 22. In at least one embodiment of the present invention, the housing 22 has an elongated configuration, as illustrated in the Figures, having an adaptor 18 at one end to facilitate the connection of the universal injection valve assembly 10 to a small scale engine or other device including, but not limited to, a stirling engine or a 4-cycle steam engine. The adaptor 18 may comprise a plurality of standard size external threads, as illustrated in the Figures, such that the entire universal injection valve assembly 10 may be connected to a standard size threaded socket of the small scale engine or other device. The adapter 18 is further structured to permit direct injection of an operative fluid into a combustion chamber or similar structure of the small scale engine or other device, thereby eliminating the lag time normally associated with providing the operative fluid from a standard injector assembly to a device.

The injector assembly 20 includes an inlet aperture 24 and an outlet aperture 28. In a preferred embodiment of the present invention, the inlet aperture 24 and the outlet aperture 28 are disposed in fluid communication with a chamber 25, having a fixed volume, such that an operative fluid enters the injector assembly 20 through the inlet aperture 24 and flows into the chamber 25. Upon actuation of the universal injection valve assembly 10, an accurately controlled amount of the operative fluid is directly injected from the chamber 25 through the outlet aperture 28, as will be explained in greater detail below. The present invention may utilize water or any one of a number of other compressible materials, as the operative fluid. When water is the operative fluid it is preferably at an elevated temperature and pressure, such as, by way of example only, approximately 700 degrees Fahrenheit and 3,200 pounds per square inch, respectively.

Additionally, the housing 22 of the present invention further comprises a seat 26 disposed adjacent to the outlet aperture 28, as illustrated in the Figures. In at least one embodiment of the present invention, the seat 26 comprises a conical configuration with the narrow end of the cone terminating at the outlet aperture 28. The significance of the conical configuration of the seat 26 will become apparent as the universal injection valve assembly 10 is described in further detail below.

In at least one embodiment of the present invention, the injector assembly 20 further comprises an injector temperature control unit 29. As illustrated throughout the Figures, the injector temperature control unit 29 is preferably disposed in an at least partially overlying relation to the housing 22 of the injector assembly 20, and is structured to regulate the temperature of the operative fluid, and more in particular, to maintain it at a predetermined temperature while it is in the chamber 25. This becomes important when a sufficient temperature differential exists between the block of the engine, or other device to which the injector assembly 20 is attached, and the housing 22 of the injector assembly 20, and in such instances, maintaining the temperature of the housing 22 relatively constant aids in maintaining the temperature of the operative fluid relatively constant. The injector temperature control unit 29 of the present invention may comprise any one of a number of temperature regulating devices including, but not limited to, an external electrical heating element, an immersion heating element, or a non-contact heat exchanger structured to circulate water, steam, or another heat transfer media around the housing 22 of the injector assembly 20. Regardless of the type of temperature control device utilized, the injector temperature control unit 29 is capable of regulating the temperature of the operative fluid and maintaining it at the predetermined temperature while it is in the chamber 25 of the housing 22.

The universal injection valve assembly 10 of the present invention further comprises a control member, generally shown as 30. The control member 30 is movably interconnected to the injector assembly 20 and is normally disposed in an operative position relative to the housing 22. More specifically, the control member 30 is normally disposed in a sealing engagement with the seat 26 of the housing 22 such that the operative fluid is not directly injected through the outlet aperture 28 of the housing 22 until the universal injection valve assembly 10 is actuated. The sealing engagement of the control member 30 with the seat 26 of the housing 22 at least partially defines the operative position of the control member 30 relative to the housing 22.

In a preferred embodiment of the universal injection valve assembly 10, the control member 30 includes a proximal end 32 and a distal end 34, wherein the distal end 34 of the control member 30 comprises a generally conical configuration, as illustrated throughout the Figures. Further, the generally conical configuration of the distal end 34 of the control member 30 is preferably structured to fit within the generally conical configuration of the seat 26 of the housing 22, such that the distal end 34 is disposable into a fluid restricting engagement with the seat 26. The fluid restricting engagement further defines the operative position of the control member 30 relative to the housing 22, in a fully closed orientation, as illustrated in FIG. 1.

The present invention further comprises a seal 14 which is disposed to engage at least a portion of the control member 30. Specifically, the seal 14 is mounted in a seal housing 12, which is positioned adjacent the housing 22 of the injector assembly 20, and the seal 14 is disposed around at least a portion of the control member 30. The seal housing 12 further comprises a bearing member 16, which is also preferably disposed around at least a portion of the control member 30. The seal 14 and the bearing member 16 are structured to permit at least a portion of the control member 30 to move longitudinally along the chamber 25 and the seal housing 12 while minimizing or, preferably, eliminating the escape of the operative fluid from the chamber 25 through the interface of the seal 14 and the bearing member 16 with the control member 30.

Additionally, the universal injection valve assembly 10 of the present invention further comprises a biasing element 36, disposed in a biasing element housing 37, structured to engage the control member 30. Specifically, the biasing element 36 is structured to at least temporarily retain the control member 30 in the normally operative position relative to the housing 22. As such, one portion of the biasing element 36 is interconnected to the control member 30 by a first retention mechanism 38, while another portion of the biasing element 36 is retained in a substantially fixed position, in relation to the control member 30, by a second retention mechanism 39. As illustrated in FIG. 1, at least one embodiment of the present invention comprises a spring-like structure as the biasing element 36, with the first retention mechanism 38 attached directly to the control member 30, while the second retention mechanism 39 comprises a notch or a groove in an actuator 41, which is described in detail below. However, it is envisioned that alternate embodiments of the present invention may comprise another type of biasing element 36 and/or retention mechanisms 38, 39 to retain the biasing element 36 and the control member 30 in position within the biasing element housing 37 and relative to the housing 22 of the injector assembly 20, respectively.

The universal injection valve assembly 10 of the present invention further comprises an actuation assembly, generally shown as 40 throughout the Figures. The actuation assembly 40 includes an actuator 41 which is preferably disposed in an at least partially surrounding relationship with at least the proximal end 32 of the control member 30. In addition, the actuation assembly 40 includes an induction mechanism 42, which is preferably disposed in an at least partially surrounding relationship with at least a portion of the actuator 41, as illustrated in the Figures. In one embodiment of the present invention, the induction mechanism 42 comprises a wire 42' configured in a multiplicity of coils wrapped around at least a portion of the actuator 41. The induction mechanism 42 is structured to intermittently dispose the actuator 41 into an energized state at any one of a plurality of cyclic rates. In a preferred embodiment of the present invention, the energized state comprises the generation of an electromagnetic field in the actuator 41.

A preferred embodiment further comprises an electrical switching array, for example, a mosfet array, which comprises a plurality of mosfets wired in parallel and structured to trigger simultaneously with a DC power source, such as a conventional 12 volt DC automobile battery. In one embodiment, a total of six mosfets, each having a continuous load rating of 40 amperes at 12 volts D.C. are utilized and, as a result, the entire array has a capacity of 240 amperes at 12 volts D.C. As such, the electrical switching array is more than sufficient to intermittently dispose the actuator 41 into an energized state at any one of the plurality of cyclic rates which may be required for efficient operation of the small scale engine or other device utilizing the universal injection valve assembly 10. In addition, the electrical switching array is quickly and efficiently adjustable to alternate between the plurality of cyclic rates by, for example, a computer control device.

Further, in a preferred embodiment, the control member 30 at least partially comprises a material, preferably in the proximal end 32, which is attracted to the actuator 41 in the energized state. Therefore, the actuator 41 in the energized state is cooperatively disposed to displace the control member 30 from the operative position relative to the housing 22, thereby at least partially opening the path of flow between the chamber 25 and the outlet aperture 28, allowing direct injection of the accurately controlled amount of the operative fluid from the injector assembly 20 directly into the chamber or other structure of the device to which the universal injection valve assembly 10 is connected. It is understood that any one of a number of other types of induction mechanisms 42 may be utilized and fall within the scope and intent of the present invention.

Additionally, in at least one embodiment of the present invention, the actuation assembly 40 further comprises an inductor temperature control unit 50 which is structured to regulate the temperature of the induction mechanism 42. In one preferred embodiment, the inductor temperature control unit 50 comprises a fluid passage 50' extending lengthwise through the wire 42' of the induction mechanism 42, as illustrated in the exploded cross-sectional view identified as A. In this embodiment, a fluid heat transfer media, such as water or another high impedance coolant, is circulated through the fluid passage 50' of the inductor temperature control unit 50 thereby removing heat from the wire 42' so as to prevent the wire 42' of the induction mechanism 42 from overheating.

The actuation assembly 40 of the present invention further comprises a primary stop 43 which is structured and disposed to contact the control member 30 to limit the displacement of the control member 30 when the actuator 41 is in an energized state. FIG. 2 illustrates the displacement of the control member 30 into contact with the primary stop 43, resulting in a fully open orientation of the universal injection valve assembly 10. The primary stop 43, similar to the seat 26 of the housing 22, preferably comprises an at least partially conical configuration, as illustrated throughout the Figures, structured to receive the proximal end 32 of the control member 30, which also comprises an at least partially conical configuration.

Furthermore, at least one embodiment of the universal injection valve assembly 10 of the present invention includes an adjustment guide 44 and a secondary stop 45 which is selectively positionable along at least a portion of the adjustment guide 44. In a preferred embodiment, the adjustment guide 44 comprises a cylindrical channel through a portion of the inductor 41, through which the secondary stop 45 is selectively positionable. The secondary stop 45 is positionable such that at least a portion of the secondary stop 45 extends outward beyond an adjustment guide aperture 46, thereby placing the secondary stop 45 into proximity with the proximal end 32 of the control member 30, such that the control member 30 contacts the secondary stop 45, and not the primary stop 43. More specifically, the secondary stop 45 is positionable into any one of a plurality of different contacting relationships with the control member 30, each defining a specific displacement of the control member 30 from the operative position relative to the housing 22. In addition, the secondary stop 45 further limits the displacement of the control member 30, thereby providing a plurality of partially open orientations, such as the one illustrated in FIG. 3. Each of these partially open orientations, as well as the fully open orientation, at least partially defines the accurately controlled amount of the operative fluid which will be directly injected from the universal injection valve assembly 10. This is due to the fact that each specific displacement of the control member 30 defines a specific path of flow from the chamber 25 through the outlet aperture 28 and this, ultimately and accurately, controls the rate or amount of the operative fluid directly injected from the universal injection valve assembly 10.

A further embodiment of the present invention comprises an adjustment mechanism 47 which is structured to selectively position the secondary stop 45 along the adjustment guide 44. The adjustment mechanism 47, in a preferred embodiment, comprises a metering gear interconnected to one end of the secondary stop 45 such that rotation of the adjustment mechanism 47 causes the secondary stop 45 to move longitudinally along the adjustment guide 44, either towards or away from the adjustment guide aperture 46, depending on the direction of rotation of the adjustment mechanism 47. In addition, the present invention may incorporate a drive mechanism 48, such as, by way of example only, a servo motor, which is structured to engage the adjustment mechanism 47 and thereby selectively position the secondary stop 45 along the adjustment guide 44. Further, this embodiment comprises an interface mechanism 49, such as, once again by way of example only, a servo gear, which operatively interconnects the drive mechanism 48 to the adjustment mechanism 47 so as to effect rotation of the adjustment mechanism 47 when the drive mechanism 48 is activated. Thus, when the drive mechanism 48 is activated, the interface mechanism 49 engages the adjustment mechanism 47, which rotates with the interface mechanism 49, thereby selectively positioning the secondary stop 45 along the adjustment guide 44. The drive mechanism 48 is activated in response to changing load demands on the small scale engine or other device and, in at least one embodiment, the drive mechanism 48 is activated by linkage interconnected to an accelerator pedal, such as those found in most automobiles, or the governor control in the case of a generator set. Of course, it is appreciated that alternate embodiments of the present invention may employ other devices to effect the selective positioning of the secondary stop 45 along the adjustment guide 44 which are encompassed in the scope and intent of the present invention.

The combination of the control member 30, the primary stop 43, the secondary stop 45, and the drive mechanism 48, in the universal injection valve assembly 10 of the present invention allows for a wide range of accurately controlled amounts of the operative fluid at the predetermined temperature to be directly injected into the small scale engine or other devices, such as, by way of example only, a stirling engine or a 4-cycle steam engine, as required by their varying loads, by the universal injection valve assembly 10 of the present invention. As previously indicated, the specific displacement of the control member 30, which varies with the position of the secondary stop 45, accurately controls the rate or amount of the operative fluid directly injected from the universal injection valve assembly 10. Thus, the amount of operative fluid directly injected each time the universal injection valve assembly 10 is actuated is quickly and efficiently varied by simply repositioning the secondary stop 45 utilizing the drive mechanism 48. Additionally, the cyclic rate at which the accurately controlled amount of the operative fluid is directly injected by the universal injection valve assembly 10 is easily varied by simple adjustment of the electrical switching mosfet array.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A universal injection valve assembly comprising:
   an injector assembly having a housing,
   a control member movably interconnected to said injector assembly,
   said control member normally disposed in an operative position relative to said housing,
   an actuation assembly including an actuator, said actuator being cooperatively disposed to at least temporarily displace said control member out of said operative position,
   said actuation assembly comprising a primary stop disposed to contact said control member and limit said displacement of said control member,
   said actuation assembly further comprising a secondary stop selectively positionable along at least a portion of an adjustment guide, and
   an inductor temperature control unit disposed in heat transferring relation to an induction mechanism and structured to regulate a temperature thereof.

2. The assembly as recited in claim 1 wherein said secondary stop is selectively positionable into a plurality of contacting relationships with said control member, further limiting said displacement of said control member.

3. An assembly as recited in claim 2 wherein said secondary stop includes an adjustment mechanism.

4. An assembly as recited in claim 3 further comprising a drive mechanism disposed to engage said adjustment mechanism.

5. An assembly as recited in claim 4 further comprising an interface mechanism structured to operatively interconnect said drive mechanism and said adjustment member.

6. An assembly as recited in claim 5 wherein said drive mechanism is structured to selectively position said secondary stop into said plurality of contacting relationships with said control member.

7. An assembly as recited in claim 1 wherein said induction mechanism is structured to at least temporarily dispose said actuator into an energized state.

8. An assembly as recited in claim 7 wherein said induction mechanism is disposed in an at least partially overlying relation to said actuator.

9. An assembly as recited in claim 8 wherein said induction mechanism comprises a wire.

10. An assembly as recited in claim 9 wherein said inductor temperature control unit comprises a fluid heat transfer media.

11. An assembly as recited in claim 7 further comprising an electrical switching array structured to intermittently apply an electrical current to said induction mechanism to intermittently dispose said actuator into said energized state.

12. An assembly as recited in claim 11 wherein said energized state comprises an electromagnetic field.

13. An assembly as recited in claim 1 wherein said housing further comprises an inlet aperture and an outlet aperture.

14. An assembly as recited in claim 13 wherein said housing further comprises a seat disposed adjacent to said outlet aperture.

15. An assembly as recited in claim 14 wherein said operative position is at least partially defined by said control member disposed in a sealing engagement with said seat.

16. An assembly as recited in claim 15 wherein said control member includes a distal end.

17. An assembly as recited in claim 16 wherein said operative position is further defined by said distal end of said control member disposed in a fluid restricting engagement with said seat.

18. An assembly as recited in claim 1 further comprising a biasing element interconnected to said control member, said biasing element structured to at least temporarily retain said control member in said operative position relative to said housing.

19. An assembly as recited in claim 1 wherein said induction mechanism is structured to at least temporarily dispose said actuator into an energized state.

20. An assembly as recited in claim 19 wherein said control member at least partially comprises material attracted to said actuator in said energized state.

21. An assembly as recited in claim 20 wherein said actuator in said energized state is cooperatively disposed to displace said control member out of said operative position.

22. A universal injection valve assembly comprising:
an injector assembly having a housing, said injector assembly further comprising an inlet aperture and an outlet aperture,
said housing further comprising a seat disposed adjacent said outlet aperture,
a control member movably interconnected to said injector assembly,
said control member normally disposed in an operative position relative to said housing,
said operative position at least partially defined by said control member disposed in a sealing engagement with said seat,
an actuation assembly including an actuator, said actuator being cooperatively disposed to at least temporarily displace said control member out of said operative position,
said actuation assembly comprising a primary stop disposed to contact said control member and limit said displacement of said control member,
said actuation assembly further comprising a secondary stop selectively positionable along at least a portion of an adjustment guide,
an injector temperature control unit disposed in a heat transferring relation to said housing and structured to regulate a temperature of an operative fluid and maintain it at a predetermined temperature, and
an inductor temperature control unit disposed in heat transferring relation to an induction mechanism and structured to regulate a temperature thereof.

23. The assembly as recited in claim 22 wherein said secondary stop is selectively positionable into a plurality of contacting relationships with said control member, further limiting said displacement of said control member.

24. An assembly as recited in claim 22 wherein said housing further comprises a chamber.

25. An assembly as recited in claim 24 wherein said injector temperature control unit is structured to regulate the temperature of the operative fluid and maintain it at a predetermined temperature in said chamber.

26. An assembly as recited in claim 25 wherein the operative fluid is water.

27. A universal injection valve assembly comprising:
an injector assembly having a housing, said injector assembly further comprising an inlet aperture and an outlet aperture disposed in fluid communication with a chamber,
said housing further comprising a seat disposed adjacent said outlet aperture,
a control member movably interconnected to said injector assembly,
said control member having a distal end, said distal end normally disposed in a fluid restricting engagement with said housing,
an injector temperature control unit disposed in a heat transferring relation to said housing and structured to regulate a temperature of an operative fluid and maintain it at a predetermined temperature in said chamber,
an actuation assembly including an actuator and an induction mechanism, said induction mechanism structured to at least temporarily dispose said actuator into an energized state,
said actuation assembly comprising a primary stop disposed to contact said control member and limit said displacement of said control member,
said actuation assembly comprising a secondary stop selectively positionable along at least a portion of an adjustment guide,
an inductor temperature control unit disposed in heat transferring relation to said induction mechanism and structured to regulate a temperature thereof, and
said actuator in said energized state being cooperatively disposed to at least temporarily displace said distal end of said control member out of said fluid restricting engagement.

28. The assembly as recited in claim 27 wherein said secondary stop is selectively positionable into a plurality of contacting relationships with said control member, further limiting said displacement of said control member.

29. A universal injection valve assembly comprising:

an injector assembly having a housing, said injector assembly further comprising an inlet aperture and an outlet aperture disposed in fluid communication with a chamber, said housing further comprising a seat disposed adjacent said outlet aperture, a control member movably interconnected to said injector assembly, said control member having a distal end, said distal end normally disposed in a fluid restricting engagement with said housing, an injector temperature control unit disposed in a heat transferring relation to said housing and structured to regulate a temperature of an operative fluid and maintain it at a predetermined temperature in said chamber, an actuation assembly including an actuator and an induction mechanism, said induction mechanism structured to at least temporarily dispose said actuator into an energized state, an inductor temperature control unit disposed in heat transferring relation to an induction mechanism and structured to regulate a temperature thereof, said induction mechanism comprising a wire, said inductor temperature control unit comprises a fluid passage extending lengthwise through said wire of said induction mechanism permitting a fluid heat transfer media to flow in a heat transferring relation to said wire, said actuator in said energized state being cooperatively disposed to at least temporarily displace said distal end of said control member out of said fluid restricting engagement, said actuation assembly comprising a primary stop disposed to contact said control member and limit said displacement of said distal end of said control member, said actuation assembly further comprising a secondary stop selectively positionable along at least a portion of an adjustment guide, said secondary stop selectively positionable into a plurality of contacting relationships with said control member, further limiting said displacement of said distal end of said control member, and an electrical switching array structured to intermittently apply an electrical current to said induction mechanism to intermittently dispose said actuator into said energized state.

\* \* \* \* \*

UNITED STATES PATENT AND TRADEMARK OFFICE
CERTIFICATE OF CORRECTION

| | | |
|---|---|---|
| PATENT NO. | : 7,552,715 B1 | |
| APPLICATION NO. | : 11/037583 | |
| DATED | : June 30, 2009 | |
| INVENTOR(S) | : Jeremy Holmes | |

It is certified that error appears in the above-identified patent and that said Letters Patent is hereby corrected as shown below:

The drawing sheet, consisting of Fig. 3, should be deleted to be replaced with the drawing sheet, consisting of Fig. 3, as shown on the attached pages.

Signed and Sealed this

Tenth Day of November, 2009

David J. Kappos
*Director of the United States Patent and Trademark Office*

FIG. 3